United States Patent
Bogdanov et al.

(10) Patent No.: US 12,452,637 B2
(45) Date of Patent: Oct. 21, 2025

(54) MECHANISM FOR DETECTING ATTACKS ON FREQUENCY OFFSET IN A WIRELESS NETWORK

(71) Applicant: Intel Corporation, Santa Clara, CA (US)

(72) Inventors: Michael Bogdanov, Hod Ha-Sharon (IL); Yael Anati, Ramat Gan (IL)

(73) Assignee: Intel Corporation, Santa Clara, CA (US)

( * ) Notice: Subject to any disclaimer, the term of this patent is extended or adjusted under 35 U.S.C. 154(b) by 789 days.

(21) Appl. No.: 17/645,975

(22) Filed: Dec. 24, 2021

(65) Prior Publication Data

US 2022/0116760 A1  Apr. 14, 2022

(51) Int. Cl.
*H04W 4/80* (2018.01)
*H04L 25/02* (2006.01)
*H04W 4/02* (2018.01)

(52) U.S. Cl.
CPC .......... *H04W 4/80* (2018.02); *H04L 25/022* (2013.01); *H04W 4/023* (2013.01)

(58) Field of Classification Search
CPC ........ H04W 4/80; H04W 4/023; H04L 25/022
USPC ...................................................... 455/41.2
See application file for complete search history.

(56) References Cited

U.S. PATENT DOCUMENTS

| | | | |
|---|---|---|---|
| 9,306,781 B2* | 4/2016 | Shin | H04L 27/14 |
| 2003/0043947 A1* | 3/2003 | Zehavi | H04B 1/7156 |
| | | | 375/334 |
| 2019/0052484 A1* | 2/2019 | Lindskog | H04L 63/14 |
| 2020/0118373 A1* | 4/2020 | Stitt | B60R 25/246 |
| 2022/0173946 A1* | 6/2022 | Wu | H03L 7/23 |

FOREIGN PATENT DOCUMENTS

| | | | | |
|---|---|---|---|---|
| EP | 4002785 A1 * | 5/2022 | | H04L 27/106 |
| WO | WO-2020077234 A9 * | 5/2021 | | B60R 25/2072 |

* cited by examiner

*Primary Examiner* — Mong-Thuy T Tran
(74) *Attorney, Agent, or Firm* — Eversheds Sutherland (US) LLP

(57) ABSTRACT

This disclosure describes systems, methods, and devices for a mechanism for detecting attacks on frequency offset in a wireless network. A device may receive a packet from a reflector device, wherein the packet comprises an access code and a coded sequence of bits. The device may also receive a tone signal from the reflector device. The device may then calculate a first frequency offset estimation associated with the packet and calculate a second frequency offset estimation associated with the tone signal. The device may then calculate a difference between the first frequency offset estimation and the second frequency offset estimation. The device may further identify an allowable threshold range of the difference.

20 Claims, 10 Drawing Sheets

MECHANISM FOR DETECTING ATTACKS ON FREQUENCY OFFSET IN A WIRELESS NETWORK

TECHNICAL FIELD

This disclosure generally relates to systems and methods for wireless communications and, more particularly, to a mechanism for detecting attacks on frequency offset in a Wireless Network.

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

DETAILED DESCRIPTION

Figure 1:
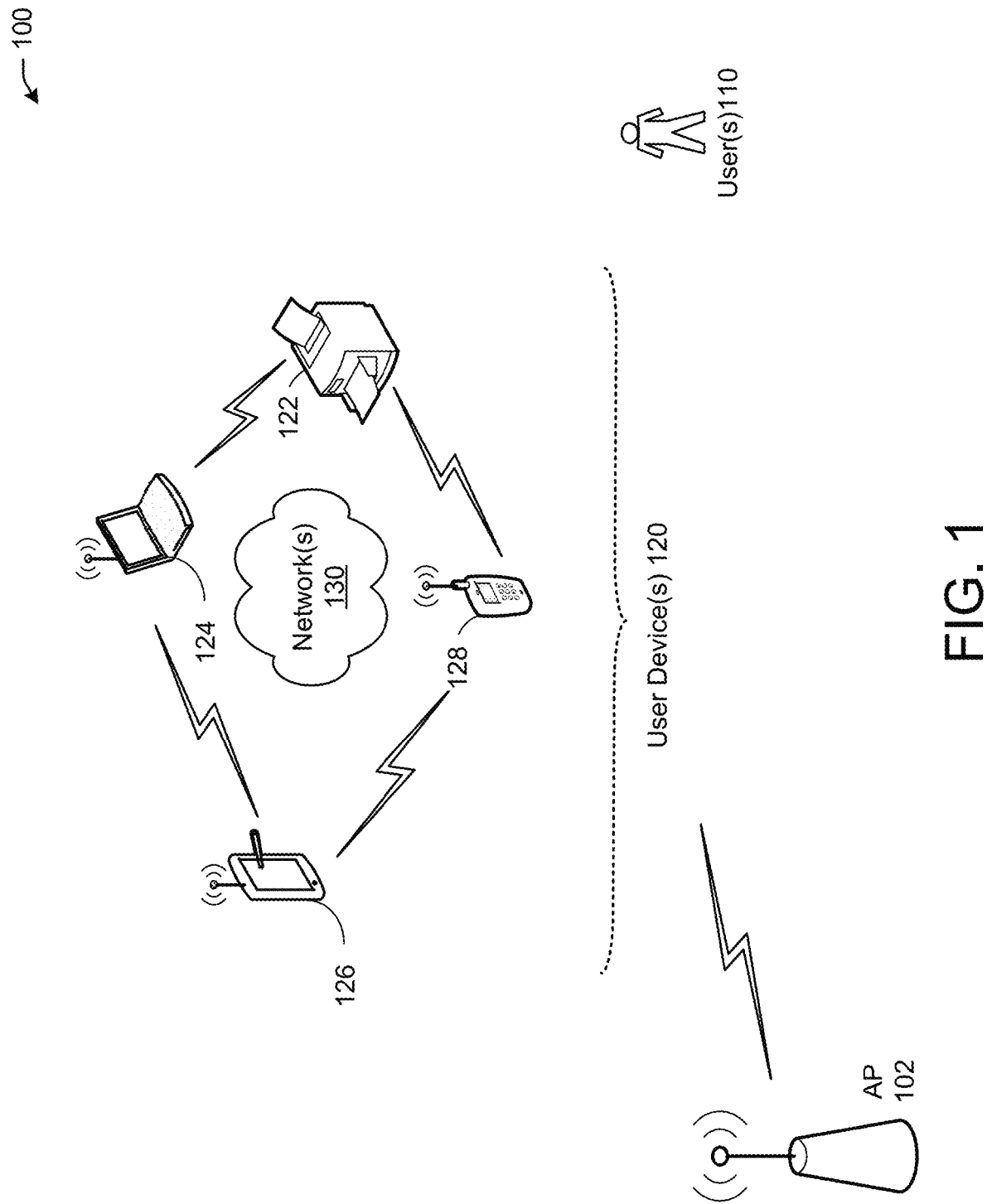
FIG. 1 is a network diagram illustrating an example network environment for detecting attacks on frequency offset, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Each wireless network may facilitate certain Bluetooth® features, such as High Accuracy Distance Measurement (HADM). HADM may be used to measure a distance between two devices configured to use Bluetooth® technology. For example, a first device that initiates a Bluetooth® connection to a second device may be known as an initiator device, while the second device may be known as the reflector device.

The present mechanism for measuring a distance between two devices is to transmit a tone signal from the reflector device to the initiator device. The initiator device may calculate a phase of the tone signal when it receives the tone signal, and an initial phase of the tone signal at the time of transmission may be further made known to the initiator device. For example, the initiator device may listen to its own previous transmission and record itself in order to know the initial phase of the tone signal. Other methods may also be used to ensure that the initial phase of the tone signal at the time of transmission is known to the initiator device. A phase difference can thus be calculated as the difference between the phase of the tone signal when the initiator device receives the tone signal and the initial phase of the tone signal. The phase difference may then be used to measure the distance between the initiator device and the reflector device.

Currently, in order to calculate a phase of the tone signal when the initiator device receives the tone signal, the frequency of the tone signal must be known. If the frequency has been offset (e.g., interfered with), then the phase calculation may deviate from the actual phase of the tone signal when the initiator device receives the tone signal. The deviation in the phase calculation may then result in an inaccurate measurement of the distance between the initiator device and the reflector device, since distance is directly related to the phase difference.

However, because tone signals may be vulnerable to interference, inaccuracies in distance measurement may arise due to interference that causes incorrect detection of a frequency used to transmit the tone signal, which may then result in distortion in the initiator device's calculation of the phase difference. Further, although frequency offsets naturally occur during HADM events, an inaccurate frequency offset estimation may then result in an inaccurate distance measurement. Interference may be deliberate or unintentional. For example, unintentional interference may include Wi-Fi signals in the surrounding area, other Bluetooth® devices in the surrounding area, or any other form of interference operating in a same frequency range of the tone signal. For example, one possible frequency range of the tone signal may be from 2.4 GHz to 2.4835 GHz. Further, deliberate interference may involve a hacker listening to Bluetooth® transmissions to discover the initiation of procedures associated with HADM events, and the hacker then transmitting additional tone(s) or whiteout signals in order to disrupt the distance measurement. As a result, because the current mechanism does not proactively detect if interference may have occurred before attempting the distance measurement, the distance measurement may be inaccurate if interference has occurred but was not detected.

It would thus be beneficial to replace the present mechanism for calculating a distance between two Bluetooth® devices with a mechanism that allows an initiator device to verify the absence of interference with the tone signal prior to proceeding with the distance calculation.

Since there is presently no mechanism for a Bluetooth® device to verify the absence of interference with the tone signal prior to proceeding with the distance calculation, the Bluetooth® device has no knowledge of whether interference has occurred. However, because of this lack of knowledge of whether interference has occurred, in some instances, the distance measurement may be inaccurate because the initiator device may incorrectly determine the frequency at which the tone signal is transmitted.

Example embodiments of the present disclosure relate to systems, methods, and devices for a mechanism for detecting attacks on frequency offset in a wireless network.

In one embodiment, an attack on frequency detection system may facilitate a mechanism for detecting attacks on frequency offset.

In one or more embodiments, a device can receive a packet from a reflector device, where the packet comprises an access code and a coded sequence of bits. The packet can be coded using Gaussian Frequency Shift Keying (GFSK). The device can be an initiator device. The initiator device and the reflector device can both be configured for Bluetooth® transmissions. Prior to the device receiving the packet from the reflector device, the device can have already synchronized to the reflector device by first sending a different packet comprising a preamble having an access code and a coded sequence of bits to the reflector device.

In one or more embodiments, the device can further receive a tone signal from the reflector device.

In one or more embodiments, the device can calculate a first frequency offset estimation associated with the packet. This can be done by calculating the frequency offset estimation of the coded sequence of bits.

In one or more embodiments, the device can calculate a second frequency offset estimation associated with the tone signal. For example, when the device receives the tone signal, it can sample the tone signal to calculate the second frequency offset estimation.

In one or more embodiments, the device can calculate a difference between the first frequency offset estimation and the second frequency offset estimation, and the device can identify an allowable threshold range of the difference. As an example, an allowable threshold range can include a range of up to 10 kHz. If the difference is determined to not be within the allowable threshold range, the tone signal can be flagged as having been interfered with. In such an instance, the device can then omit a subsequent frequency offset calculation and discontinue the High Accuracy Distance Measurement (HADM) event in order to prevent an inaccurate distance measurement. Interference with the tone signal can take the form of a transmission of an attack tone that is stronger than the tone signal. If the difference is determined to be within the allowable threshold range, the tone signal can be flagged as not having been interfered with. The distance between the device and the reflector device can then be calculated based at least in part on the difference.

The proposed solution enables a mechanism to provide Bluetooth® devices with a mechanism to accurately calculate a distance between two Bluetooth® devices. Such a mechanism not only ensures the accuracy of the distance calculations, but also eliminates wasteful distance calculations if the distance calculation is likely to be inaccurate. The proposed solution thus further enables a Bluetooth® device to better detect interference with Bluetooth® transmissions.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is a network diagram illustrating an example wireless network 100 of a system for detecting attacks on frequency offset, according to some example embodiments of the present disclosure. Wireless network 100 can include one or more user devices 120 (e.g., 122, 124, 126, or 128), which may communicate in accordance with wireless standards, such as Bluetooth and the IEEE 802.11 communication standards, over network(s) 130.

Figure 5:
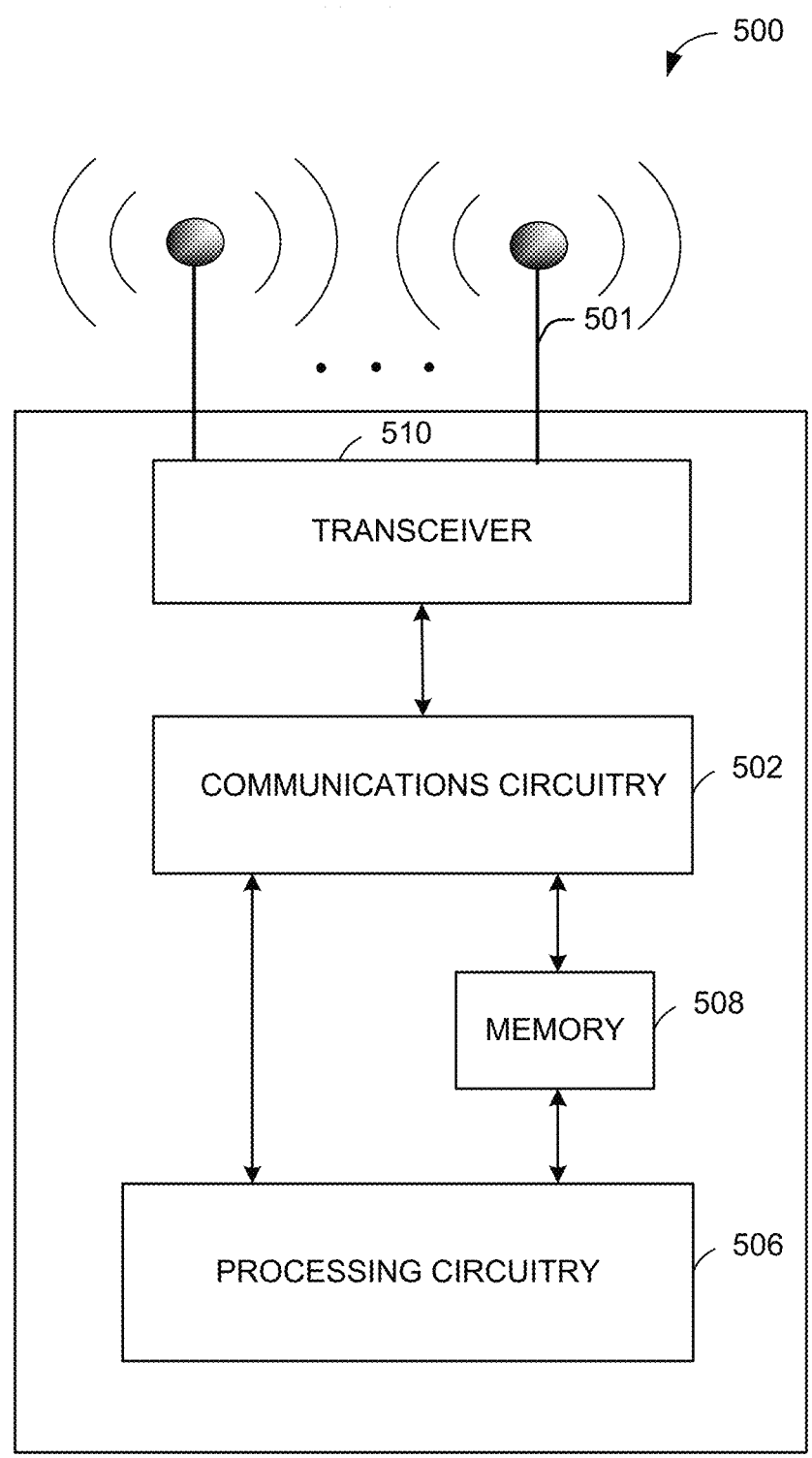
FIG. 5 illustrates a functional diagram of an exemplary communication station that may be suitable for use as a user device, in accordance with one or more example embodiments of the present disclosure.
Figure 6:
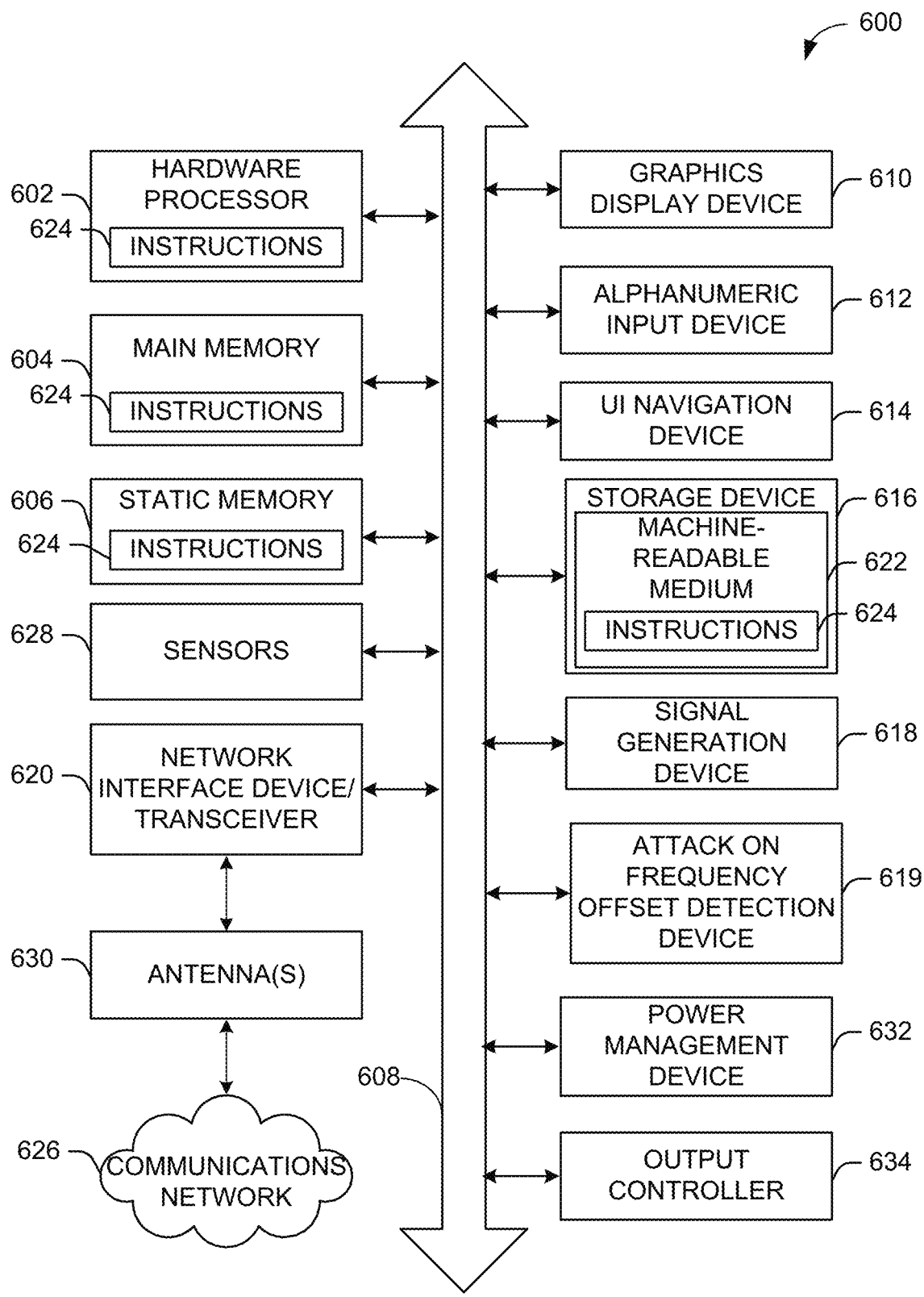
FIG. 6 illustrates a block diagram of an example machine upon which any of one or more techniques (e.g., methods) may be performed, in accordance with one or more example embodiments of the present disclosure.

In some embodiments, the user devices 120 can include one or more computer systems similar to that of the functional diagram of FIG. 5 and/or the example machine/system of FIG. 6.

One or more illustrative user device(s) 120 may be operable by one or more user(s) 110. The user device(s) 120 (e.g., 122, 124, 126, or 128) may include any suitable processor-driven user device including, but not limited to, a desktop user device, a laptop user device, a server, a router, a switch, an access point, a smartphone, a tablet, a wearable wireless device (e.g., a bracelet, a watch, glasses, a ring, etc.), and so forth.

Any of the user devices 120 (e.g., 122, 124, 126, or 128) may be configured to communicate with each other and any other component of the wireless network 100 directly and/or via the one or more communications networks 130, wirelessly or wired.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

Any of the communications networks 130 may include, but not be limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user devices 120 (e.g., 122, 124, 126, or 128) may include one or more communications antennas. Communications antennas may be any suitable type of antenna corresponding to the communications protocols used by the user device(s) 120. Some non-limiting examples of suitable communications antennas include Bluetooth antennas, Wi-Fi antennas, IEEE 802.11 family of standards compatible antennas, directional antennas, non-directional antennas, dipole antennas, folded dipole antennas, patch antennas, MIMO antennas, or the like. The communications antenna may be communicatively coupled to a radio component to transmit and/or receive signals, such as communications signals, to and/or from the user devices 120 (e.g., 122, 124, 126, or 128).

Any of the user devices 120 (e.g., 122, 124, 126, or 128) may include any suitable radio and/or transceiver for transmitting and/or receiving radio frequency (RF) signals in the bandwidth and/or channels corresponding to the communications protocols utilized by any of the user device(s) 120 to communicate with each other. The radio components may include hardware and/or software to modulate and/or demodulate communications signals according to pre-established transmission protocols. The radio components may further have hardware and/or software instructions to communicate via one or more Bluetooth, Wi-Fi, and/or Wi-Fi Direct protocols, as standardized by the Bluetooth and the Institute of Electrical and Electronics Engineers (IEEE) 802.11 standards.

In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), or 60 GHZ channels (e.g., 802.11ad). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Some embodiments may be used in conjunction with devices and/or networks operating in accordance with existing Wireless Fidelity (Wi-Fi) Alliance (WFA) Specifications, including Wi-Fi Neighbor Awareness Networking (NAN) Technical Specification (e.g., NAN and NAN2) and/or future versions and/or derivatives thereof, devices and/or networks operating in accordance with existing WFA Peer-to-Peer (P2P) specifications and/or future versions and/or derivatives thereof, devices and/or networks operating in accordance with existing Wireless-Gigabit-Alliance (WGA) specifications (Wireless Gigabit Alliance, Inc WiGig MAC and PHY Specification) and/or future versions and/or derivatives thereof, devices and/or networks operating in accordance with existing IEEE 802.11 standards and/or amendments (e.g., 802.11b, 802.11g, 802.11n, 802.11ac, 802.11ax, 802.11ad, 802.11ay, 802.11az, etc.).

It is understood that the above descriptions are for purposes of illustration and are not meant to be limiting.

Figure 2:
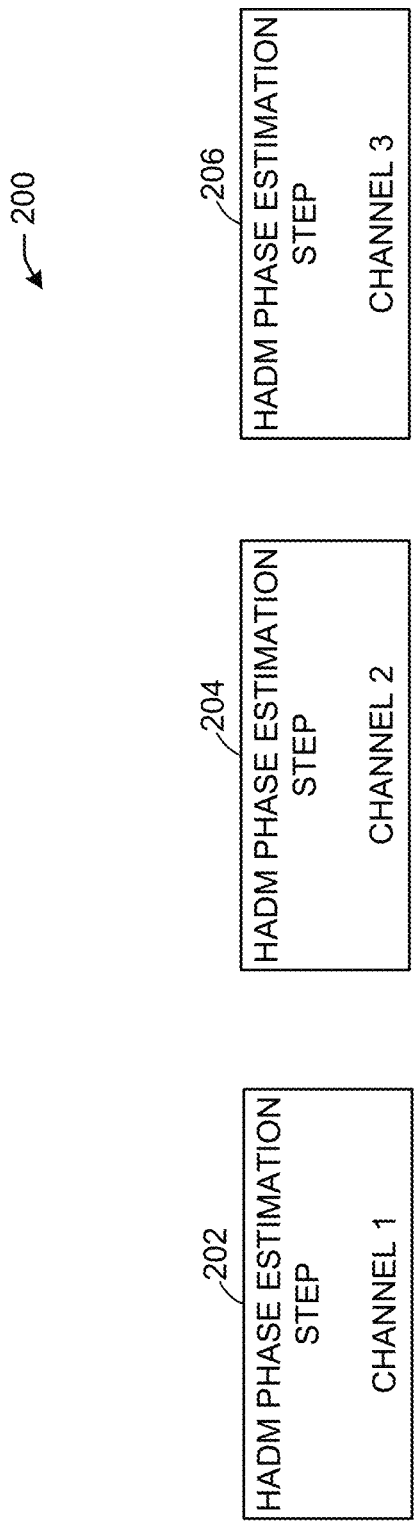
FIG. 2 depicts an illustrative schematic diagram for detecting attacks on frequency offset, in accordance with one or more example embodiments of the present disclosure.

FIG. 2 depicts an illustrative schematic diagram for detecting attacks on frequency offset, in accordance with one or more example embodiments of the present disclosure.

A Bluetooth® feature for performing distance measurements between two devices that are configured for Bluetooth® transmissions is known as High Accuracy Distance Measurement (HADM). The two devices may be known as an initiator device and a reflector device. The two devices may be any of user device(s) 120 (e.g., 122, 124, 126, and 128) as depicted in FIG. 1. These distance measurements may be conducted through packet and tone signal exchanges between the initiator device and the reflector device, which may also be known as steps.

The current mechanism for calculating a distance between the initiator device and the reflector device uses a phase change of the tone signal propagated through the air from the reflector device to the initiator device. The phase change of the tone signal may be calculated as:

$$\theta = 2\pi * f * t \bmod(2\pi) = 2\pi * f * \frac{D}{C} \bmod(2\pi),$$

where f represents a frequency of the tone signal, t represents the time of propagation, D represents the distance of propagation, and C represents the speed of light. Thus, the distance between the initiator device and the reflector device, which is represented by D, is directly correlated to the phase change of the tone signal.

In some instances, as depicted in FIG. 2, in order to avoid ambiguity in the phase change calculation associated with the circular nature of a phase and to allow for the measurement of increased distances, multiple frequencies may be used to determine multiple phase change measurements on multiple channels. Thus, during the HADM frequency offset estimation step 200, a first HADM phase estimation step 202 may be carried out at Channel 1, a second HADM phase estimation step 204 may be carried out at Channel 2, and a third HADM phase estimation step 206 may be carried out at Channel 3. The first HADM phase estimation step 202, the second HADM phase estimation step 204, and the third HADM phase estimation step 206 may occur at the initiator device when a tone signal has been transmitted to the initiator device from the reflector device. Each of Channels 1, 2, and 3 should reflect the same distance between the initiator device and the reflector device.

Because frequency offset may naturally occur in various instances, the frequency of the tone signal, f, may vary from the actual frequency of the tone signal. Frequency offset may thus affect the phase change formula such that the frequency used to calculate phase change is (f+Δf), which is the sum of the actual frequency of the tone signal and the frequency offset. However, when the phase change formula calculates phase change as $$\theta = 2\pi * (f + \Delta f) * t \bmod(2\pi) = 2\pi * (f + \Delta f) * \frac{D}{C} \bmod(2\pi),$$

the distance calculation will be impacted as Δf increases.

Further, because tone signals may be vulnerable to attacks or interference, frequency offset estimations may be affected when a tone signal has been attacked or interfered with. Inaccurate frequency offset estimations may then result in inaccurate compensations to inaccurate distance calculations, thus causing the entire HADM event to become corrupted.

Figure 3:
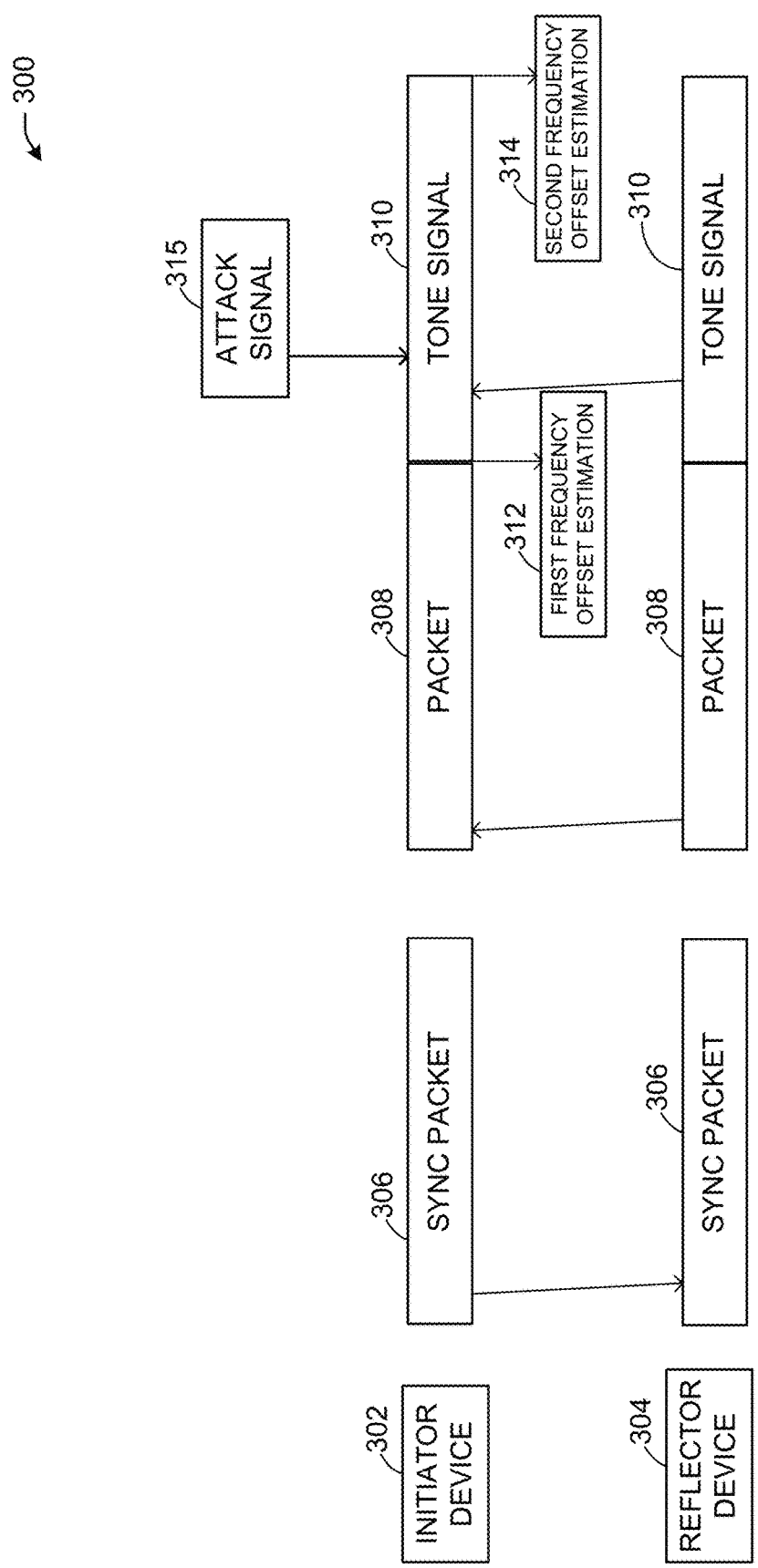
FIG. 3 depicts an illustrative schematic diagram for detecting attacks on frequency offset, in accordance with one or more example embodiments of the present disclosure.

FIG. 3 depicts an illustrative schematic diagram for detecting attacks on frequency offset, in accordance with one or more example embodiments of the present disclosure.

In a mechanism 300 for detecting attacks on frequency offset, an initiator device 302 may first synchronize to a reflector device 304 by transmitting a sync packet 306 comprising a preamble and an access code. After the reflector device 304 has detected the sync packet 306, the reflector device 304 may then transmit a packet 308 comprising a low-energy structure having at least a preamble comprising an access code and a coded sequence of bits. The packet 308 may further include a trailer, and the packet 308 may obtain its security from a pseudo-random sequence of coded bits used in the access code. In some instances, the packet 308 may be a partial packet comprising only the preamble. After the reflector device 304 has transmitted the packet 308, the reflector device 304 may then transmit a tone signal 310 to the initiator device 302.

When the initiator device 302 receives the packet 308, the initiator device 302 may detect the packet and calculate a first frequency offset estimation 312 of the coded sequence of bits. The packet 308 may be low-energy coded, which is a type of Gaussian Frequency Shift Keying (GFSK) coding. GFSK coding provides for each of the coded sequence of bits to be encoded into tones of various frequencies. The estimation of the first frequency offset estimation 312 of the packet 308 is particularly beneficial because of the increased accuracy associated with frequency offset estimations of a packet. Further, the coded sequence of bits of the packet 308 are encoded and are therefore unknown to the attacker, which renders the packet 308 less vulnerable to attacks or other forms of interference.

When the initiator device 302 subsequently receives the tone signal 310, the initiator device 302 may calculate a second frequency offset estimation 314 of the tone signal. The initiator device 302 may then calculate a difference between the first frequency offset estimation 312 and the second frequency offset estimation 314.

If the difference is within an allowable threshold range, then the initiator device 302 may assume that no interference occurred during the transmission of the tone signal 310. In such an instance, the initiator device 302 may proceed with the rest of the HADM event.

If the difference is not within an allowable threshold range, then the initiator device 302 may assume that interference has occurred during the transmission of the tone signal 310. For example, attack signal 315 may be used to interfere with the tone signal 310. Interference may take the form of unintentional interference, such as Wi-Fi signals in the surrounding area, another Bluetooth®-configured device in the surrounding area, or other energy sources operating in a similar frequency range, or a deliberate attack, such as a deliberate transmission of a stronger tone that has a deliberate frequency offset when compared to the tone signal 310. For example, a hacker may opt to transmit an additional tone, an additional collection of tones, a whiteout signal, or other interference to disrupt the tone signal 310. In another example, the unintentional interference may take the form of other energy sources operating in approximately the 2.4 GHz to 2.480 GHz frequency range. In such an instance, any distance calculations based on the tone signal 310 may be inaccurate, and thus the initiator device 302 may terminate future transmissions associated with the HADM event or flag the HADM event as invalid.

The allowable threshold range may vary. In some instances, the allowable threshold range may include a range of 10 kHz from the first frequency offset estimation 312.

Figure 4:
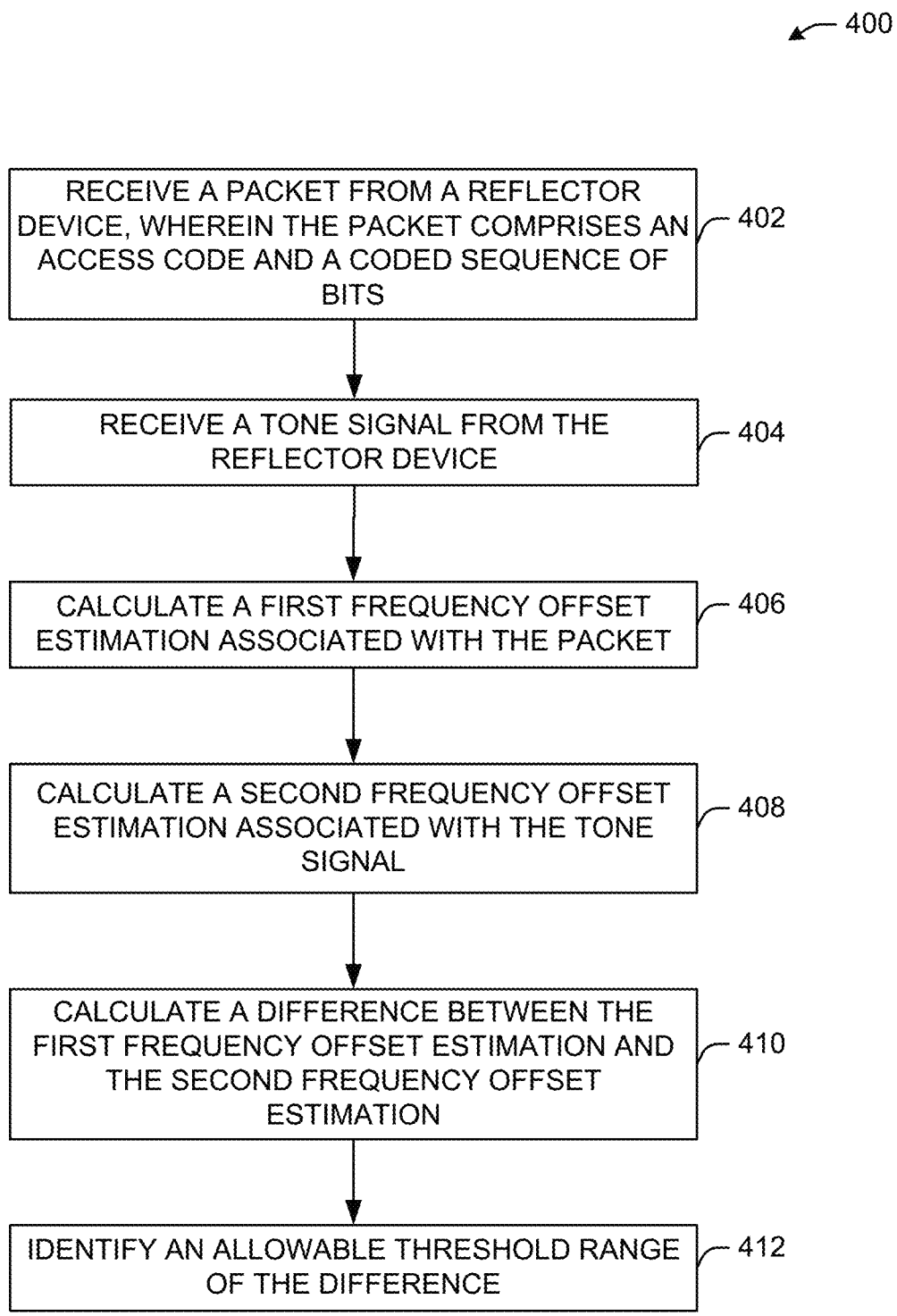
FIG. 4 illustrates a flow diagram of illustrative process for an illustrative attack on frequency offset detection system, in accordance with one or more example embodiments of the present disclosure.

FIG. 4 illustrates a flow diagram of illustrative process 400 for a mechanism for detecting attacks on frequency offset in a wireless network, in accordance with one or more example embodiments of the present disclosure.

At block 402, a device (e.g., the user device(s) 120 and/or the AP 102 of FIG. 1) may receive a packet from a reflector device, wherein the packet comprises an access code and a coded sequence of bits. The device may be an initiator device. The initiator device may be configured for Bluetooth® transmissions. The reflector device may also be configured for Bluetooth® transmissions.

At block 404, the device may receive a tone signal from the reflector device.

At block 406, the device may calculate a first frequency offset estimation associated with the packet. The packet may be coded using Gaussian Frequency Shift Keying (GFSK).

At block 408, the device may calculate a second frequency offset estimation associated with the tone signal.

At block 410, the device may calculate a difference between the first frequency offset estimation and the second frequency offset estimation.

At block 412, the device may identify an allowable threshold range of the difference. If the device determines that the difference is not within the allowable threshold range, the device may further flag the tone signal as having been interfered with. An example of the tone signal being interfered with may include a transmission of an attack tone that is stronger than the tone signal. If the tone signal is flagged as having been interfered with, the device may further omit a subsequent frequency offset calculation. Alternatively, if the device determines that the difference is within the allowable threshold range, the device may further flag the tone signal as not having been interfered with. A distance between the initiator device and the reflector device may also be calculated based at least in part on the difference.

It is understood that the above descriptions are for purposes of illustration and are not meant to be limiting.

FIG. 5 shows a functional diagram of an exemplary communication station 500, in accordance with one or more example embodiments of the present disclosure. In one embodiment, FIG. 5 illustrates a functional block diagram of a communication station that may be suitable for use as an AP 102 (FIG. 1) or a user device 120 (FIG. 1) in accordance with some embodiments. The communication station 500 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 500 may include communications circuitry 502 and a transceiver 510 for transmitting and receiving signals to and from other communication stations using one or more antennas 501. The communications circuitry 502 may include circuitry that can operate the physical layer (PHY) communications and/or medium access control (MAC) communications for controlling access to the wireless medium, and/or any other communications layers for transmitting and receiving signals. The communication station 500 may also include processing circuitry 506 and memory 508 arranged to perform the operations described herein. In some embodiments, the communications circuitry 502 and the processing circuitry 506 may be configured to perform operations detailed in the above figures, diagrams, and flows.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication station 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 500 may include one or more antennas 501. The antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device.

FIG. 6 illustrates a block diagram of an example of a machine 600 or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environments. The machine 600 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker), an attack on frequency offset detection device 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 602 for generation and processing of the baseband signals and for controlling operations of the main memory 604, the storage device 616, and/or the attack on frequency offset detection device 619. The baseband processor may be provided on a single radio card, a single chip, or an integrated circuit (IC).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The attack on frequency offset detection device 619 may carry out or perform any of the operations and processes (e.g., process 400) described and shown above.

It is understood that the above are only a subset of what the attack on frequency offset detection device 619 may be configured to perform and that other functions included throughout this disclosure may also be performed by the attack on frequency offset detection device 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 7:
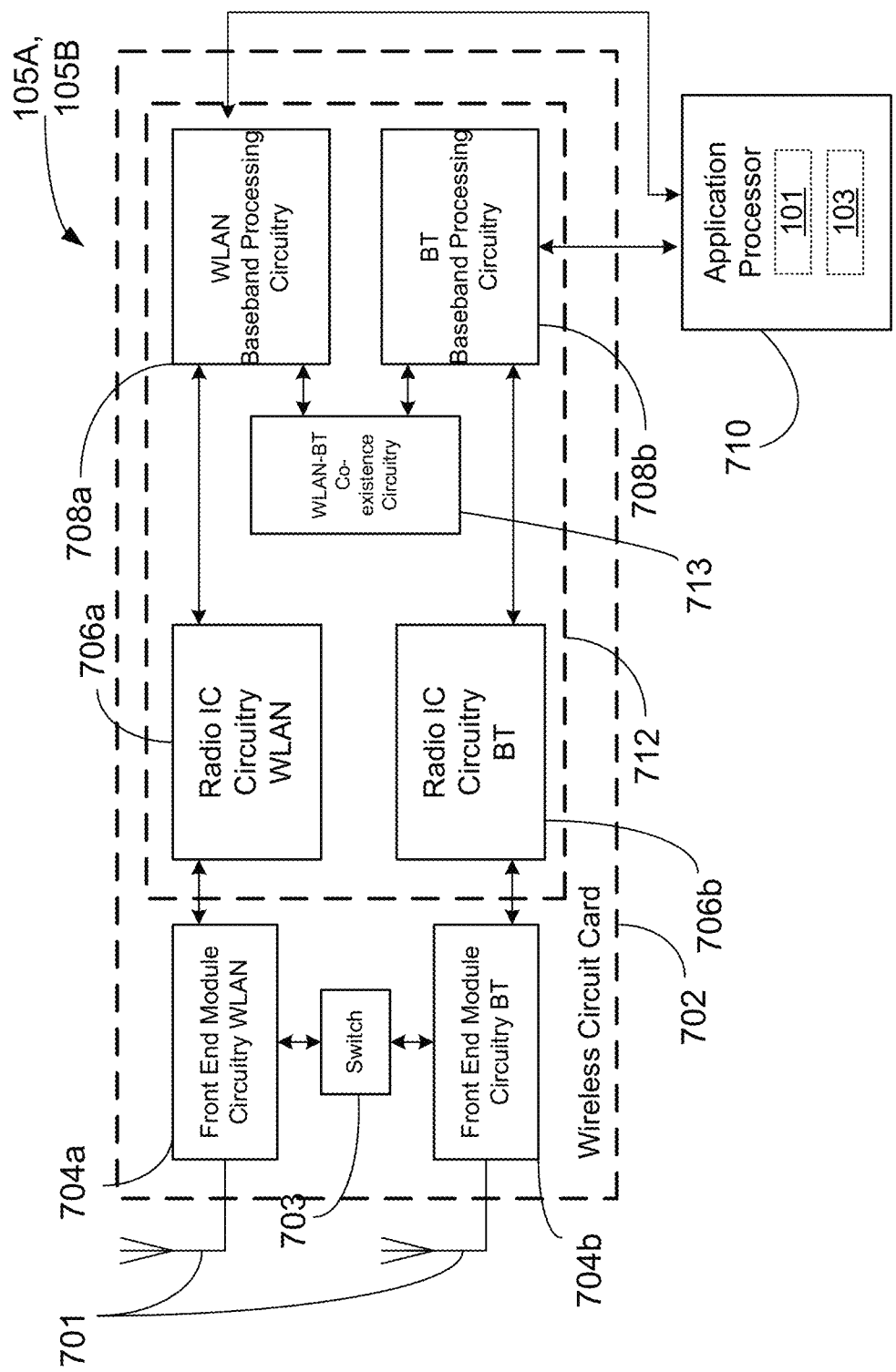
FIG. 7 is a block diagram of a radio architecture in accordance with some examples.

FIG. 7 is a block diagram of a radio architecture 105A, 105B in accordance with some embodiments that may be implemented in any one of the example APs 102 and/or the example user device(s) 120 of FIG. 1. Radio architecture 105A, 105B may include radio front-end module (FEM) circuitry 704*a*-*b*, radio IC circuitry 706*a*-*b* and baseband processing circuitry 708*a*-*b*. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 704*a*-*b* may include a WLAN or Wi-Fi FEM circuitry 704*a* and a Bluetooth (BT) FEM circuitry 704*b*. The WLAN FEM circuitry 704*a* may include a receive signal path comprising circuitry configured to operate on WLAN RF signals received from one or more antennas 701, to amplify the received signals and to provide the amplified versions of the received signals to the WLAN radio IC circuitry 706*a* for further processing. The BT FEM circuitry 704*b* may include a receive signal path which may include circuitry configured to operate on BT RF signals received from one or more antennas 701, to amplify the received signals and to provide the amplified versions of the received signals to the BT radio IC circuitry 706*b* for further processing. FEM circuitry 704*a* may also include a transmit signal path which may include circuitry configured to amplify WLAN signals provided by the radio IC circuitry 706*a* for wireless transmission by one or more of the antennas 701. In addition, FEM circuitry 704*b* may also include a transmit signal path which may include circuitry configured to amplify BT signals provided by the radio IC circuitry 706*b* for wireless transmission by the one or more antennas. In the embodiment of FIG. 7, although FEM 704*a* and FEM 704*b* are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 706*a*-*b* as shown may include WLAN radio IC circuitry 706*a* and BT radio IC circuitry 706*b*. The WLAN radio IC circuitry 706*a* may include a receive signal path which may include circuitry to down-convert WLAN RF signals received from the FEM circuitry 704*a* and provide baseband signals to WLAN baseband processing circuitry 708*a*. BT radio IC circuitry 706*b* may in turn include a receive signal path which may include circuitry to down-convert BT RF signals received from the FEM circuitry 704*b* and provide baseband signals to BT baseband processing circuitry 708*b*. WLAN radio IC circuitry 706*a* may also include a transmit signal path which may include circuitry to up-convert WLAN baseband signals provided by the WLAN baseband processing circuitry 708*a* and provide WLAN RF output signals to the FEM circuitry 704*a* for subsequent wireless transmission by the one or more antennas 701. BT radio IC circuitry 706*b* may also include a transmit signal path which may include circuitry to up-convert BT baseband signals provided by the BT baseband processing circuitry 708*b* and provide BT RF output signals to the FEM circuitry 704*b* for subsequent wireless transmission by the one or more antennas 701. In the embodiment of FIG. 7, although radio IC circuitries 706*a* and 706*b* are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 708*a*-*b* may include a WLAN baseband processing circuitry 708*a* and a BT baseband processing circuitry 708*b*. The WLAN baseband processing circuitry 708*a* may include a memory, such as, for example, a set of RAM arrays in a Fast Fourier Transform or Inverse Fast Fourier Transform block (not shown) of the WLAN baseband processing circuitry 708*a*. Each of the WLAN baseband circuitry 708*a* and the BT baseband circuitry 708*b* may further include one or more processors and control logic to process the signals received from the corresponding WLAN or BT receive signal path of the radio IC circuitry 706*a*-*b*, and to also generate corresponding WLAN or BT baseband signals for the transmit signal path of the radio IC circuitry 706*a*-*b*. Each of the baseband processing circuitries 708*a* and 708*b* may further include physical layer (PHY) and medium access control layer (MAC) circuitry, and may further interface with a device for generation and processing of the baseband signals and for controlling operations of the radio IC circuitry 706*a*-*b*.

Referring still to FIG. 7, according to the shown embodiment, WLAN-BT coexistence circuitry 713 may include logic providing an interface between the WLAN baseband circuitry 708*a* and the BT baseband circuitry 708*b* to enable use cases requiring WLAN and BT coexistence. In addition, a switch 703 may be provided between the WLAN FEM circuitry 704*a* and the BT FEM circuitry 704*b* to allow switching between the WLAN and BT radios according to application needs. In addition, although the antennas 701 are depicted as being respectively connected to the WLAN FEM circuitry 704*a* and the BT FEM circuitry 704*b*, embodiments include within their scope the sharing of one or more antennas as between the WLAN and BT FEMs, or the provision of more than one antenna connected to each of FEM 704*a* or 704*b*.

In some embodiments, the front-end module circuitry 704*a*-*b*, the radio IC circuitry 706*a*-*b*, and baseband processing circuitry 708*a*-*b* may be provided on a single radio card, such as wireless radio card 702. In some other embodiments, the one or more antennas 701, the FEM circuitry 704*a*-*b* and the radio IC circuitry 706*a*-*b* may be provided on a single radio card. In some other embodiments, the radio IC circuitry 706*a*-*b* and the baseband processing circuitry 708*a*-*b* may be provided on a single chip or integrated circuit (IC), such as IC 712.

In some embodiments, the wireless radio card 702 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11 ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 7, the BT baseband circuitry 708b may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., SGPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 8:
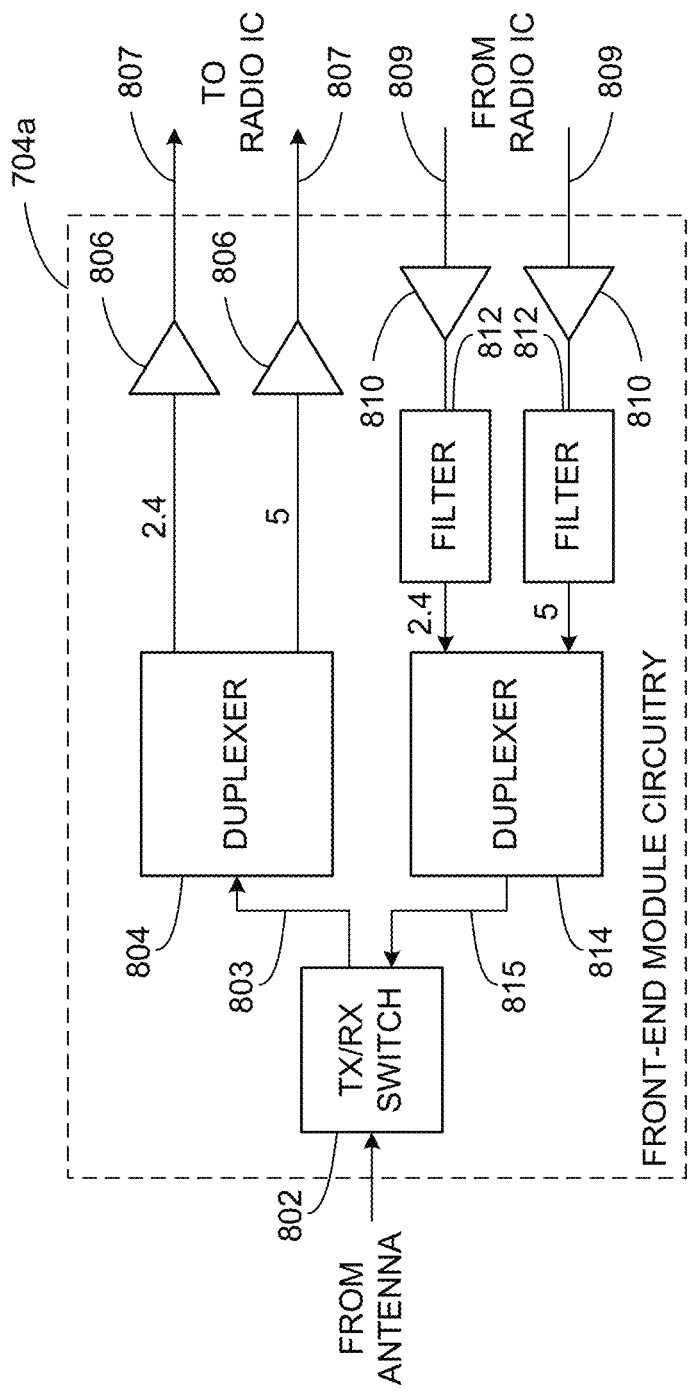
FIG. 8 illustrates an example front-end module circuitry for use in the radio architecture of FIG. 7, in accordance with one or more example embodiments of the present disclosure.

FIG. 8 illustrates WLAN FEM circuitry 704a in accordance with some embodiments. Although the example of FIG. 8 is described in conjunction with the WLAN FEM circuitry 704a, the example of FIG. 8 may be described in conjunction with the example BT FEM circuitry 704b (FIG. 7), although other circuitry configurations may also be suitable.

In some embodiments, the FEM circuitry 704a may include a TX/RX switch 802 to switch between transmit mode and receive mode operation. The FEM circuitry 704a may include a receive signal path and a transmit signal path. The receive signal path of the FEM circuitry 704a may include a low-noise amplifier (LNA) 806 to amplify received RF signals 803 and provide the amplified received RF signals 807 as an output (e.g., to the radio IC circuitry 706a-b (FIG. 7). The transmit signal path of the circuitry 704a may include a power amplifier (PA) to amplify input RF signals 809 (e.g., provided by the radio IC circuitry 706a-b), and one or more filters 812, such as band-pass filters (BPFs), low-pass filters (LPFs) or other types of filters, to generate RF signals 815 for subsequent transmission (e.g., by one or more of the antennas 701 (FIG. 7) via an example duplexer 814.

In some dual-mode embodiments for Wi-Fi communication, the FEM circuitry 704a may be configured to operate in either the 2.4 GHz frequency spectrum or the 5 GHz frequency spectrum. In these embodiments, the receive signal path of the FEM circuitry 704a may include a receive signal path duplexer 804 to separate the signals from each spectrum as well as provide a separate LNA 806 for each spectrum as shown. In these embodiments, the transmit signal path of the FEM circuitry 704a may also include a power amplifier 810 and a filter 812, such as a BPF, an LPF or another type of filter for each frequency spectrum and a transmit signal path duplexer 804 to provide the signals of one of the different spectrums onto a single transmit path for subsequent transmission by the one or more of the antennas 701 (FIG. 7). In some embodiments, BT communications may utilize the 2.4 GHz signal paths and may utilize the same FEM circuitry 704a as the one used for WLAN communications.

Figure 9:
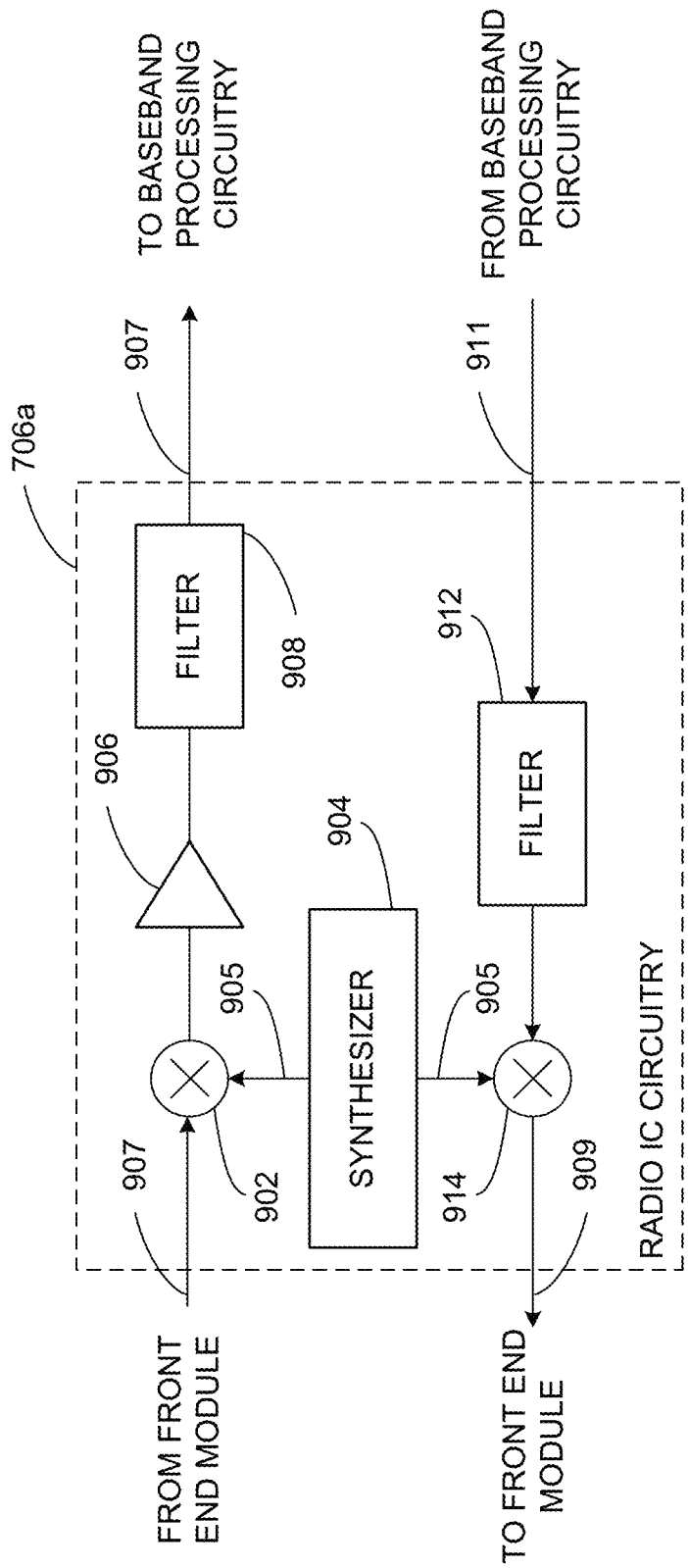
FIG. 9 illustrates an example radio IC circuitry for use in the radio architecture of FIG. 7, in accordance with one or more example embodiments of the present disclosure.

FIG. 9 illustrates radio IC circuitry 706a in accordance with some embodiments. The radio IC circuitry 706a is one example of circuitry that may be suitable for use as the WLAN or BT radio IC circuitry 706a/706b (FIG. 7), although other circuitry configurations may also be suitable. Alternatively, the example of FIG. 9 may be described in conjunction with the example BT radio IC circuitry 706b.

In some embodiments, the radio IC circuitry 706a may include a receive signal path and a transmit signal path. The receive signal path of the radio IC circuitry 706a may include at least mixer circuitry 902, such as, for example, down-conversion mixer circuitry, amplifier circuitry 906 and filter circuitry 908. The transmit signal path of the radio IC circuitry 706a may include at least filter circuitry 912 and mixer circuitry 914, such as, for example, up-conversion mixer circuitry. Radio IC circuitry 706a may also include synthesizer circuitry 904 for synthesizing a frequency 905 for use by the mixer circuitry 902 and the mixer circuitry 914. The mixer circuitry 902 and/or 914 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 9 illustrates only a simplified version of a radio IC circuitry, and may include, although not shown, embodiments where each of the depicted circuitries may include more than one component. For instance, mixer circuitry 914 may each include one or more mixers, and filter circuitries 908 and/or 912 may each include one or more filters, such as one or more BPFs and/or LPFs according to application needs. For example, when mixer circuitries are of the direct-conversion type, they may each include two or more mixers.

In some embodiments, mixer circuitry 902 may be configured to down-convert RF signals 807 received from the FEM circuitry 704a-b (FIG. 7) based on the synthesized frequency 905 provided by synthesizer circuitry 904. The amplifier circuitry 906 may be configured to amplify the down-converted signals and the filter circuitry 908 may include an LPF configured to remove unwanted signals from the down-converted signals to generate output baseband signals 907. Output baseband signals 907 may be provided to the baseband processing circuitry 708a-b (FIG. 7) for further processing. In some embodiments, the output baseband signals 907 may be zero-frequency baseband signals, although this is not a requirement. In some embodiments, mixer circuitry 902 may comprise passive mixers, although the scope of the embodiments is not limited in this respect.

In some embodiments, the mixer circuitry 914 may be configured to up-convert input baseband signals 911 based on the synthesized frequency 905 provided by the synthesizer circuitry 904 to generate RF output signals 809 for the FEM circuitry 704*a-b*. The baseband signals 911 may be provided by the baseband processing circuitry 708*a-b* and may be filtered by filter circuitry 912. The filter circuitry 912 may include an LPF or a BPF, although the scope of the embodiments is not limited in this respect.

In some embodiments, the mixer circuitry 902 and the mixer circuitry 914 may each include two or more mixers and may be arranged for quadrature down-conversion and/or up-conversion respectively with the help of synthesizer 904. In some embodiments, the mixer circuitry 902 and the mixer circuitry 914 may each include two or more mixers each configured for image rejection (e.g., Hartley image rejection). In some embodiments, the mixer circuitry 902 and the mixer circuitry 914 may be arranged for direct down-conversion and/or direct up-conversion, respectively. In some embodiments, the mixer circuitry 902 and the mixer circuitry 914 may be configured for super-heterodyne operation, although this is not a requirement.

Mixer circuitry 902 may comprise, according to one embodiment: quadrature passive mixers (e.g., for the in-phase (I) and quadrature phase (Q) paths). In such an embodiment, RF input signal 807 from FIG. 9 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 905 of synthesizer 904 (FIG. 9). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 807 (FIG. 8) may comprise a balanced signal, although the scope of the embodiments is not limited in this respect. The I and Q baseband output signals may be provided to low-noise amplifier, such as amplifier circuitry 906 (FIG. 9) or to filter circuitry 908 (FIG. 9).

In some embodiments, the output baseband signals 907 and the input baseband signals 911 may be analog baseband signals, although the scope of the embodiments is not limited in this respect. In some alternate embodiments, the output baseband signals 907 and the input baseband signals 911 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 904 may be a fractional-N synthesizer or a fractional N/N+1 synthesizer, although the scope of the embodiments is not limited in this respect as other types of frequency synthesizers may be suitable. For example, synthesizer circuitry 904 may be a delta-sigma synthesizer, a frequency multiplier, or a synthesizer comprising a phase-locked loop with a frequency divider. According to some embodiments, the synthesizer circuitry 904 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 904 may be provided by a voltage controlled oscillator (VCO), although that is not a requirement. A divider control input may further be provided by either the baseband processing circuitry 708*a-b* (FIG. 7) depending on the desired output frequency 905. In some embodiments, a divider control input (e.g., N) may be determined from a look-up table (e.g., within a Wi-Fi card) based on a channel number and a channel center frequency as determined or indicated by the example application processor 710. The application processor 710 may include, or otherwise be connected to, one of the example secure signal converter 101 or the example received signal converter 103 (e.g., depending on which device the example radio architecture is implemented in).

In some embodiments, synthesizer circuitry 904 may be configured to generate a carrier frequency as the output frequency 905, while in other embodiments, the output frequency 905 may be a fraction of the carrier frequency (e.g., one-half the carrier frequency, one-third the carrier frequency). In some embodiments, the output frequency 905 may be a LO frequency (fLO).

Figure 10:
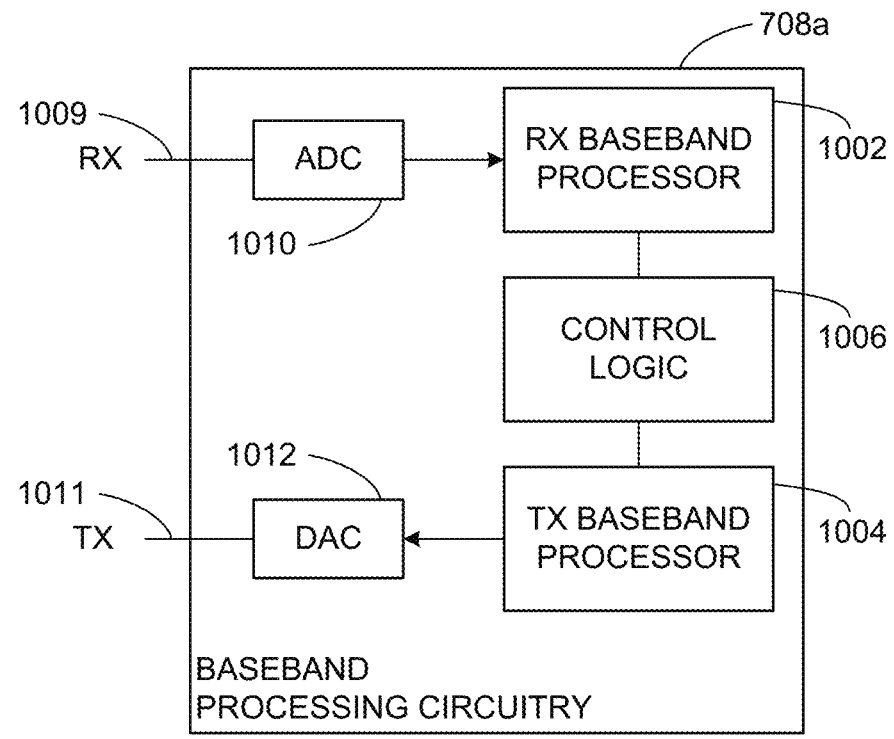
FIG. 10 illustrates an example baseband processing circuitry for use in the radio architecture of FIG. 7, in accordance with one or more example embodiments of the present disclosure.

FIG. 10 illustrates a functional block diagram of baseband processing circuitry 708*a* in accordance with some embodiments. The baseband processing circuitry 708*a* is one example of circuitry that may be suitable for use as the baseband processing circuitry 708*a* (FIG. 7), although other circuitry configurations may also be suitable. Alternatively, the example of FIG. 9 may be used to implement the example BT baseband processing circuitry 708*b* of FIG. 7.

The baseband processing circuitry 708*a* may include a receive baseband processor (RX BBP) 1002 for processing receive baseband signals 909 provided by the radio IC circuitry 706*a-b* (FIG. 7) and a transmit baseband processor (TX BBP) 1004 for generating transmit baseband signals 911 for the radio IC circuitry 706*a-b*. The baseband processing circuitry 708*a* may also include control logic 1006 for coordinating the operations of the baseband processing circuitry 708*a*.

In some embodiments (e.g., when analog baseband signals are exchanged between the baseband processing circuitry 708*a-b* and the radio IC circuitry 706*a-b*), the baseband processing circuitry 708*a* may include ADC 1010 to convert analog baseband signals 1009 received from the radio IC circuitry 706*a-b* to digital baseband signals for processing by the RX BBP 1002. In these embodiments, the baseband processing circuitry 708*a* may also include DAC 1012 to convert digital baseband signals from the TX BBP 1004 to analog baseband signals 1011.

In some embodiments that communicate OFDM signals or OFDMA signals, such as through baseband processor 708*a*, the transmit baseband processor 1004 may be configured to generate OFDM or OFDMA signals as appropriate for transmission by performing an inverse fast Fourier transform (IFFT). The receive baseband processor 1002 may be configured to process received OFDM signals or OFDMA signals by performing an FFT. In some embodiments, the receive baseband processor 1002 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 7, in some embodiments, the antennas 701 (FIG. 7) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 701 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device comprising processing circuitry coupled to storage, the processing circuitry configured to: receive a packet from a reflector device, wherein the packet comprises an access code and a coded sequence of bits; receive a tone signal from the reflector device; calculate a first frequency offset estimation associated with the packet; calculate a second frequency offset estimation associated with the tone signal; calculate a difference between the first frequency offset estimation and the second frequency offset estimation; and identify an allowable threshold range of the difference.

Example 2 may include the device of example 1 and/or some other example herein, wherein the processing circuitry is further configured to: determine that the difference is not within the allowable threshold range; and flag the tone signal as having been interfered with.

Example 3 may include the device of example 2 and/or some other example herein, wherein the processing circuitry is further configured to: omit a subsequent frequency offset calculation.

Example 4 may include the device of example 2 and/or some other example herein, wherein interference with the tone signal comprises a transmission of an attack tone that is stronger than the tone signal.

Example 5 may include the device of example 4 and/or some other example herein, wherein the processing circuitry is further configured to: determine that the difference is within the allowable threshold range; and flag the tone signal as not having been interfered with.

Example 6 may include the device of example 1 and/or some other example herein, wherein the device is an initiator device, and the reflector device and the initiator device are configured for Bluetooth® transmissions.

Example 7 may include the device of example 1 and/or some other example herein, wherein the packet is coded using Gaussian Frequency Shift Keying (GFSK).

Example 8 may include the device of example 1 and/or some other example herein, wherein a distance between the device and the reflector device is calculated based at least in part on the difference.

Example 9 may include the device of example 1 and/or some other example herein, further comprising a transceiver configured to transmit and receive wireless signals.

Example 10 may include the device of example 9 and/or some other example herein, further comprising an antenna coupled to the transceiver to cause to send the packet and the tone signal.

Example 11 may include a non-transitory computer-readable medium storing computer-executable instructions which when executed by one or more processors result in performing operations comprising: receiving a packet from a reflector device, wherein the packet comprises an access code and a coded sequence of bits; receiving a tone signal from the reflector device; calculating a first frequency offset estimation associated with the packet; calculating a second frequency offset estimation associated with the tone signal; calculating a difference between the first frequency offset estimation and the second frequency offset estimation; and identifying an allowable threshold range of the difference.

Example 12 may include the non-transitory computer-readable medium of example 11 and/or some other example herein, wherein the computer-executable instructions further result in operations comprising: determine that the difference is not within the allowable threshold range; and flag the tone signal as having been interfered with.

Example 13 may include the non-transitory computer-readable medium of example 12 and/or some other example herein, wherein the computer-executable instructions further result in operations comprising: omitting a subsequent frequency offset calculation.

Example 14 may include the non-transitory computer-readable medium of example 11 and/or some other example herein, wherein the computer-executable instructions further result in operations comprising: determine that the difference is within the allowable threshold range; and flag the tone signal as not having been interfered with.

Example 15 may include the non-transitory computer-readable medium of example 11 and/or some other example herein, wherein the reflector device is configured for Bluetooth® transmissions.

Example 16 may include the non-transitory computer-readable medium of example 11 and/or some other example herein, wherein the packet is coded using Gaussian Frequency Shift Keying (GFSK).

Example 17 may include a method comprising: receiving, at an initiator device, a packet from a reflector device, wherein the packet comprises an access code and a coded sequence of bits; receiving, at the initiator device, a tone signal from the reflector device; calculating a first frequency offset estimation associated with the packet; calculating a second frequency offset estimation associated with the tone signal; calculating a difference between the first frequency offset estimation and the second frequency offset estimation; and identifying an allowable threshold range of the difference.

Example 18 may include the method of example 17 and/or some other example herein, further comprising: determining that the difference is not within the allowable threshold range; and flagging the tone signal as having been interfered with.

Example 19 may include the method of example 18 and/or some other example herein, further comprising: omitting a subsequent frequency offset calculation.

Example 20 may include the method of example 17 and/or some other example herein, further comprising: determining that the difference is within the allowable threshold range; and flagging the tone signal as not having been interfered with.

Example 21 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 22 may include an apparatus comprising logic, modules, and/or circuitry to perform one or more elements of a method described in or related to any of examples 1-20, or any other method or process described herein.

Example 23 may include a method, technique, or process as described in or related to any of examples 1-20, or portions or parts thereof.

Example 24 may include an apparatus comprising: one or more processors and one or more computer readable media comprising instructions that, when executed by the one or more processors, cause the one or more processors to perform the method, techniques, or process as described in or related to any of examples 1-20, or portions thereof.

Example 25 may include a method of communicating in a wireless network as shown and described herein.

Example 26 may include a system for providing wireless communication as shown and described herein.

Example 27 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
receive a packet from a reflector device, wherein the packet comprises an access code and a coded sequence of bits encoded using Gaussian Frequency Shift Keying (GFSK);
receive a tone signal from the reflector device;
calculate a first frequency offset estimation associated with the packet, based at least on the coded sequence of bits;
calculate a second frequency offset estimation associated with the tone signal;
calculate a difference between the first frequency offset estimation and the second frequency offset estimation; and
identify an allowable threshold range of the difference, and determine whether the difference is within the allowable threshold range to detect potential interference with the tone signal.

2. The device of claim 1, wherein the processing circuitry is further configured to:
determine that the difference is not within the allowable threshold range; and
flag the tone signal as having been interfered with.

3. The device of claim 2, wherein the processing circuitry is further configured to:
omit a subsequent frequency offset calculation.

4. The device of claim 2, wherein interference with the tone signal comprises a transmission of an attack tone that is stronger than the tone signal.

5. The device of claim 1, wherein the processing circuitry is further configured to:
determine that the difference is within the allowable threshold range; and
flag the tone signal as not having been interfered with.

6. The device of claim 1, wherein the device is an initiator device, and the reflector device and the initiator device are configured for Bluetooth® transmissions.

7. The device of claim 1, wherein the packet is coded using Gaussian Frequency Shift Keying (GFSK).

8. The device of claim 1, wherein a distance between the device and the reflector device is calculated based at least in part on the difference.

9. The device of claim 1, further comprising a transceiver configured to transmit and receive wireless signals.

10. The device of claim 9, further comprising an antenna coupled to the transceiver to cause to send the packet and the tone signal.

11. A non-transitory computer-readable medium storing computer-executable instructions which when executed by one or more processors result in performing operations comprising:
receiving a packet from a reflector device, wherein the packet comprises an access code and a coded sequence of bits encoded using Gaussian Frequency Shift Keying (GFSK);
receiving a tone signal from the reflector device;
calculating a first frequency offset estimation associated with the packet, based at least on the coded sequence of bits;
calculating a second frequency offset estimation associated with the tone signal;
calculating a difference between the first frequency offset estimation and the second frequency offset estimation; and
identifying an allowable threshold range of the difference, and determine whether the difference is within the allowable threshold range to detect potential interference with the tone signal.

12. The non-transitory computer-readable medium of claim 11, wherein the computer-executable instructions further result in operations comprising:
determine that the difference is not within the allowable threshold range; and
flag the tone signal as having been interfered with.

13. The non-transitory computer-readable medium of claim 12, wherein the computer-executable instructions further result in operations comprising:
omitting a subsequent frequency offset calculation.

14. The non-transitory computer-readable medium of claim 11, wherein the computer-executable instructions further result in operations comprising:
determine that the difference is within the allowable threshold range; and
flag the tone signal as not having been interfered with.

15. The non-transitory computer-readable medium of claim 11, wherein the reflector device is configured for Bluetooth® transmissions.

16. The non-transitory computer-readable medium of claim 11, wherein the packet is coded using Gaussian Frequency Shift Keying (GFSK).

17. A method comprising:
receiving, at an initiator device, a packet from a reflector device, wherein the packet comprises an access code and a coded sequence of bits encoded using Gaussian Frequency Shift Keying (GFSK);
receiving, at the initiator device, a tone signal from the reflector device;
calculating a first frequency offset estimation associated with the packet, based at least on the coded sequence of bits;
calculating a second frequency offset estimation associated with the tone signal;
calculating a difference between the first frequency offset estimation and the second frequency offset estimation; and
identifying an allowable threshold range of the difference, and determine whether the difference is within the allowable threshold range to detect potential interference with the tone signal.

18. The method of claim 17, further comprising:
determining that the difference is not within the allowable threshold range; and
flagging the tone signal as having been interfered with.

19. The method of claim 18, further comprising:
omitting a subsequent frequency offset calculation.

20. The method of claim 17, further comprising:
determining that the difference is within the allowable threshold range; and
flagging the tone signal as not having been interfered with.

* * * * *